United States Patent [19]

Aloise

[11] Patent Number: 5,666,815
[45] Date of Patent: Sep. 16, 1997

[54] METHOD AND APPARATUS FOR CALCULATING SUPER HEAT IN AN AIR CONDITIONING SYSTEM

[75] Inventor: Arthur Aloise, Harwinton, Conn.

[73] Assignee: Cooper Instrument Corporation, Middlefield, Conn.

[21] Appl. No.: 342,343

[22] Filed: Nov. 18, 1994

[51] Int. Cl.$^6$ .................................................. G01K 13/00
[52] U.S. Cl. ........................................................ 62/129
[58] Field of Search ............................. 62/125, 126, 127, 62/129, 225

[56] References Cited

U.S. PATENT DOCUMENTS

| | | | |
|---|---|---|---|
| 4,510,576 | 4/1985 | MacArthur et al. | 62/125 X |
| 5,209,076 | 5/1993 | Kauffman et al. | 62/127 X |
| 5,285,647 | 2/1994 | Manz et al. | 62/129 X |
| 5,311,745 | 5/1994 | Lockhart et al. | 62/127 |

OTHER PUBLICATIONS

"Cooper News Flash —Engineers Develop Superheat Calculator To Save Servicemen Time And Money", Oct. 6, 1993, Flyer No. 66-367 (3 pages).

*Primary Examiner*—Harry B. Tanner
*Attorney, Agent, or Firm*—Chilton, Alix & Van Kirk

[57] ABSTRACT

A super heat calculator for air conditioning systems comprising a microprocessor, a control panel, a temperature sensor, and a pressure sensor. Vapor pressure models for all expected air conditioning refrigerants are stored in a data storage unit of the microprocessor. Positioning a rotary switch on the control panel directs the microprocessor to utilize the vapor pressure model associated with the refrigerant assigned to the switch position. The temperature sensor and pressure sensor are installed between the evaporator and compressor of the air conditioning system. The temperature and pressure signals are sent to a dual slope analog to digital converter located in the control panel. The temperature of the refrigerant is automatically displayed when the calculator is turned on. Pressing the SUPER-HEAT button on the control panel initiates calculation of the degree of super heat. The microprocessor reads the refrigerant temperature and pressure values and stores them in the storage unit. The data processor accesses the vapor pressure model that corresponds to the refrigerant selected by the rotary switch and calculates the vapor temperature which corresponds to the sensed refrigerant pressure by interpolation. The data processor then calculates the super heat value by subtracting the calculated vapor temperature from the value of the sensed refrigerant temperature.

18 Claims, 3 Drawing Sheets

METHOD AND APPARATUS FOR CALCULATING SUPER HEAT IN AN AIR CONDITIONING SYSTEM

BACKGROUND OF THE INVENTION

This invention relates generally to test equipment for air conditioning systems. More particularly, the present invention relates to a method and apparatus for calculating the super heat in an air conditioning system.

Proper maintenance of modern air conditioning systems requires that the operation of the system be adjusted periodically on the basis of various performance factors. One of the performance factors that is monitored is the degree of super heat present in the refrigerant between the evaporator and the compressor.

Air conditioners employ a refrigerant in a closed loop cycle to remove heat from the air contained in buildings and other structures. The air is drawn through a first heat exchanger wherein the refrigerant absorbs heat from the air. Typically, the refrigerant undergoes a phase change from a liquid to a gas in the heat exchanger to more efficiently remove heat from the air. The heated refrigerant is transported from the first heat exchanger to a second heat exchanger located outside of the structure where the heat is removed and discharged. If the refrigerant is in a gaseous state it is compressed and returned to a liquid form in the second heat exchanger. The cooled refrigerant is then transported back to the heat exchanger to remove additional heat from the air.

The refrigerant enters the first heat exchanger in a liquid state and is converted to a gaseous state as it is transported through the first heat exchanger. Generally, the refrigerant has been fully converted to the gaseous state before it exits the first heat exchanger. The gaseous refrigerant continues to absorb heat from the air and therefore becomes super heated. The degree of super heat is determined by the physical size of the first heat exchanger, the flow rates of the air and the refrigerant, the temperature drop experienced by the volummetric air flow, the temperature of the refrigerant as it enters the first heat exchanger, and physical characteristics of the refrigerant such as latent heat of vaporization and specific heat. The air conditioning system is designed for an optimum amount of super heating based upon all these factors. Therefore, the amount of super heating actually experienced in the air conditioning system is an indication of system performance.

Calculation of the degree of super heat requires measuring the pressure and temperature of the refrigerant. The saturated temperature for the refrigerant at the measured pressure is calculated by interpolating from a table of values or reading a graph. The degree of super heat is then calculated by subtracting the calculated saturated temperature from the measured temperature. Typically, this method results in inaccurate results due to the use of hand calculations and non-systematic use of the graphs or tables. In addition, many different kinds of refrigerants are utilized in modern air conditioning systems. Each refrigerant has a different physical characteristic requiring maintenance personnel to select the appropriate graph or table from among many possible graphs or tables. It is not uncommon for the wrong graph or table to be utilized, resulting in inaccurate computation of the degree of super heat.

SUMMARY OF THE INVENTION

The super heat calculator is comprised of microprocessor, a control panel, a temperature sensor, and a pressure sensor. The microprocessor includes a data processor for performing arithmetic and logic operations and a data storage unit for storing all necessary programs and digitized data including instruction data and operand data. In a preferred embodiment, vapor pressure models for all expected refrigerants would be stored in the data storage unit. Each vapor pressure model includes a listing of vapor pressures for a plurality of vapor temperature points at saturated conditions.

The control panel comprises a rotary switch, a keypad, and a display unit. Positioning the rotary switch at one of the switch positions directs the microprocessor to utilize the vapor pressure model associated with the refrigerant assigned to the switch position.

The temperature sensors are preferably a thermistor temperature probe. A current source located in the control panel provides the power necessary to operate the thermistor temperature probes. A dual slope analog to digital converter located in the control panel converts the sensed temperature signal from an analog signal to a digital signal.

The pressure sensor is in fluid communication with a pressure transducer located in the housing via the pressure sensor input jack.

The temperature probe and pressure probe are installed between the evaporator and the compressor of the subject air conditioning system. The temperature of the refrigerant (T1) is automatically displayed when the calculator is turned on. The selector switch is then positioned to select the refrigerant utilized in the air conditioning system. Button P1 is pressed to display the sensed refrigerant pressure. If both the indicated temperature and pressure are within expected limits, calculation of the degree of super heat is initiated by pressing the SUPER-HEAT button.

Upon initiation of the super heat calculation, the calculator reads the refrigerant temperature (T1) and pressure (P1) values and stores the values in the storage unit. The data processor accesses the vapor pressure model stored in the storage unit that corresponds to the refrigerant selected by the rotary switch. The data processor calculates the vapor temperature (VT1) which corresponds to the sensed refrigerant pressure (P1) by interpolation. The data processor then calculates the super heat value by subtracting the calculated vapor temperature (VT1) from the value of the sensed refrigerant temperature (T1).

The calculated super heat is compared to the ideal super heat to determine if the performance of the air conditioning unit must be adjusted. The difference between the calculated super heat and the ideal super heat indicates the type and amount of adjustment that is required.

An object of the invention is to provide a new and improved method and apparatus for computing the degree of super heat of the refrigerant in an air conditioning system.

Another object of the invention is to provide a new and improved method and apparatus for consistently interpolating the saturated temperature of a gas from a vapor pressure model.

A further object of the invention is to provide a new and improved method and apparatus for computing the degree of super heat of the refrigerant in an air conditioning system that minimizes errors.

A still further object of the invention is to provide a new and improved method to dynamically monitor system performance over an extended period of time.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
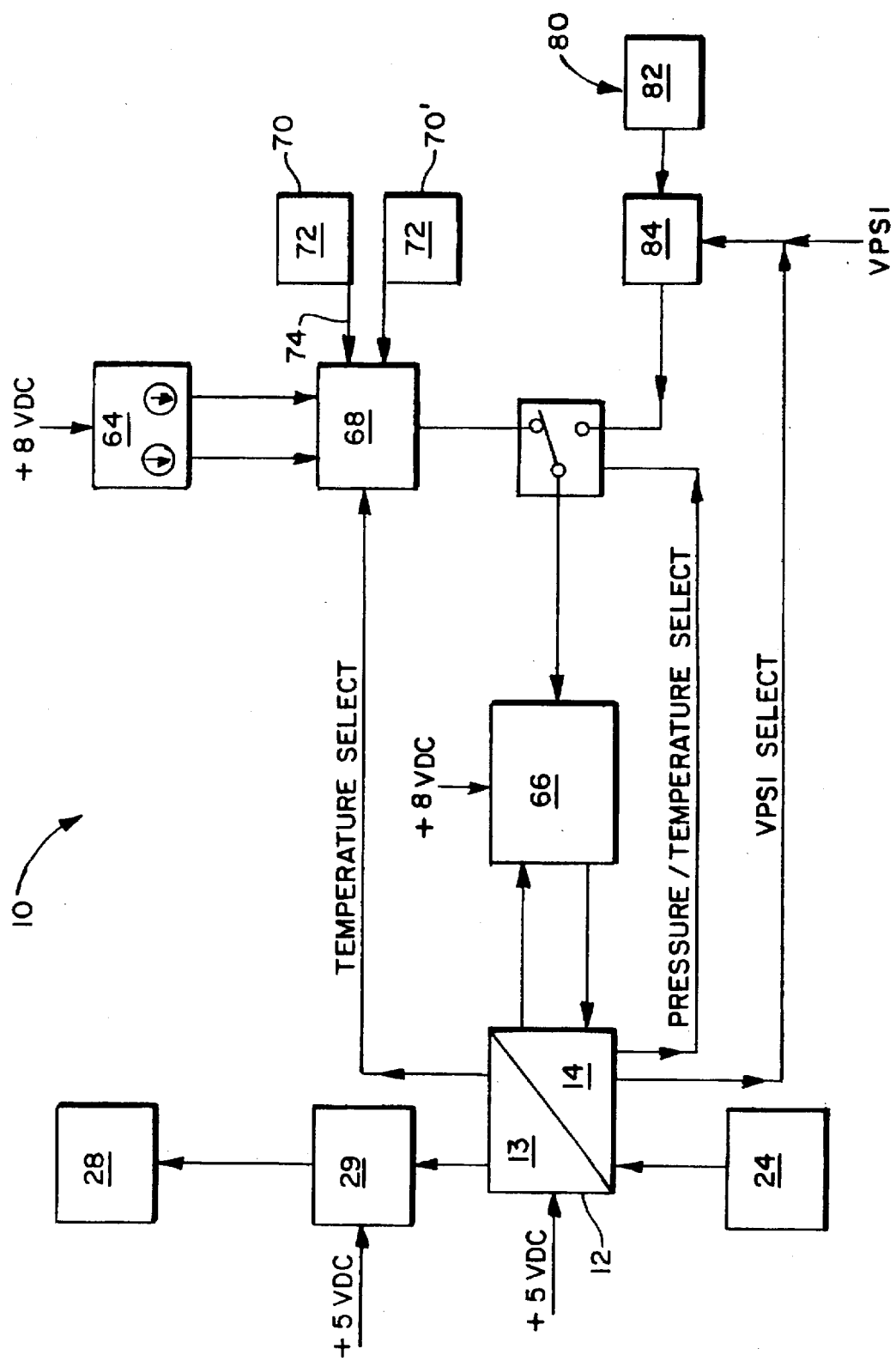
FIG. 1 is a schematic representation of a super heat calculator in accordance with the present invention.
Figure 2:
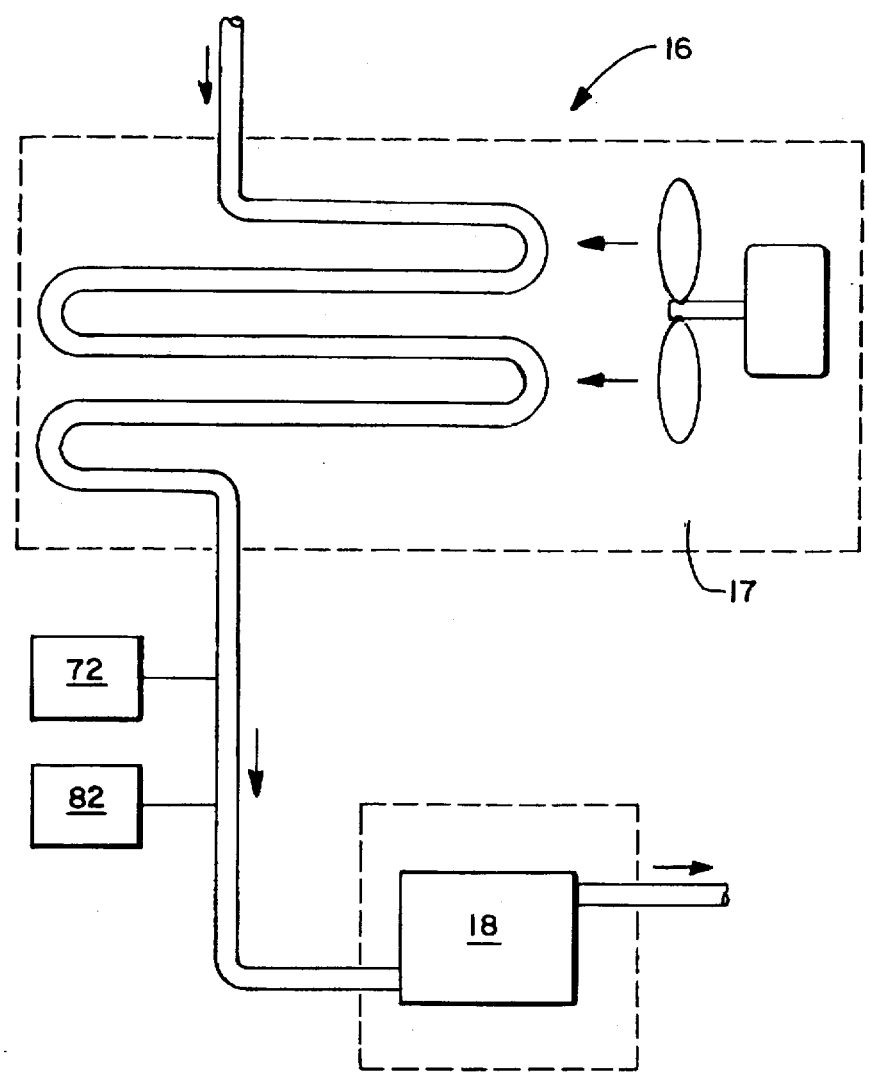
FIG. 2 is a schematic representation of an air conditioning system having installed the temperature and pressure sensors of the super heat calculator of FIG. 1.
Figure 4:
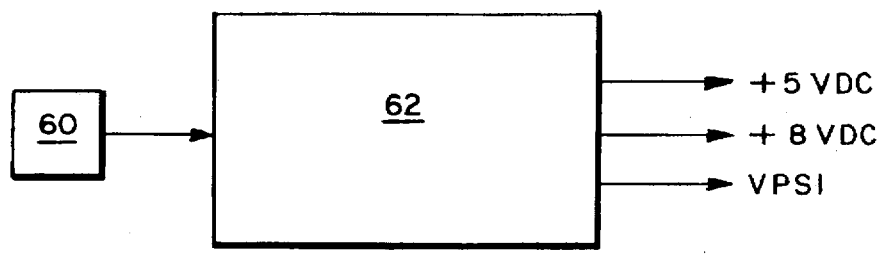
FIG. 4 is a schematic representation of the power supply of the super heat calculator of FIG. 1.
Figure 3:
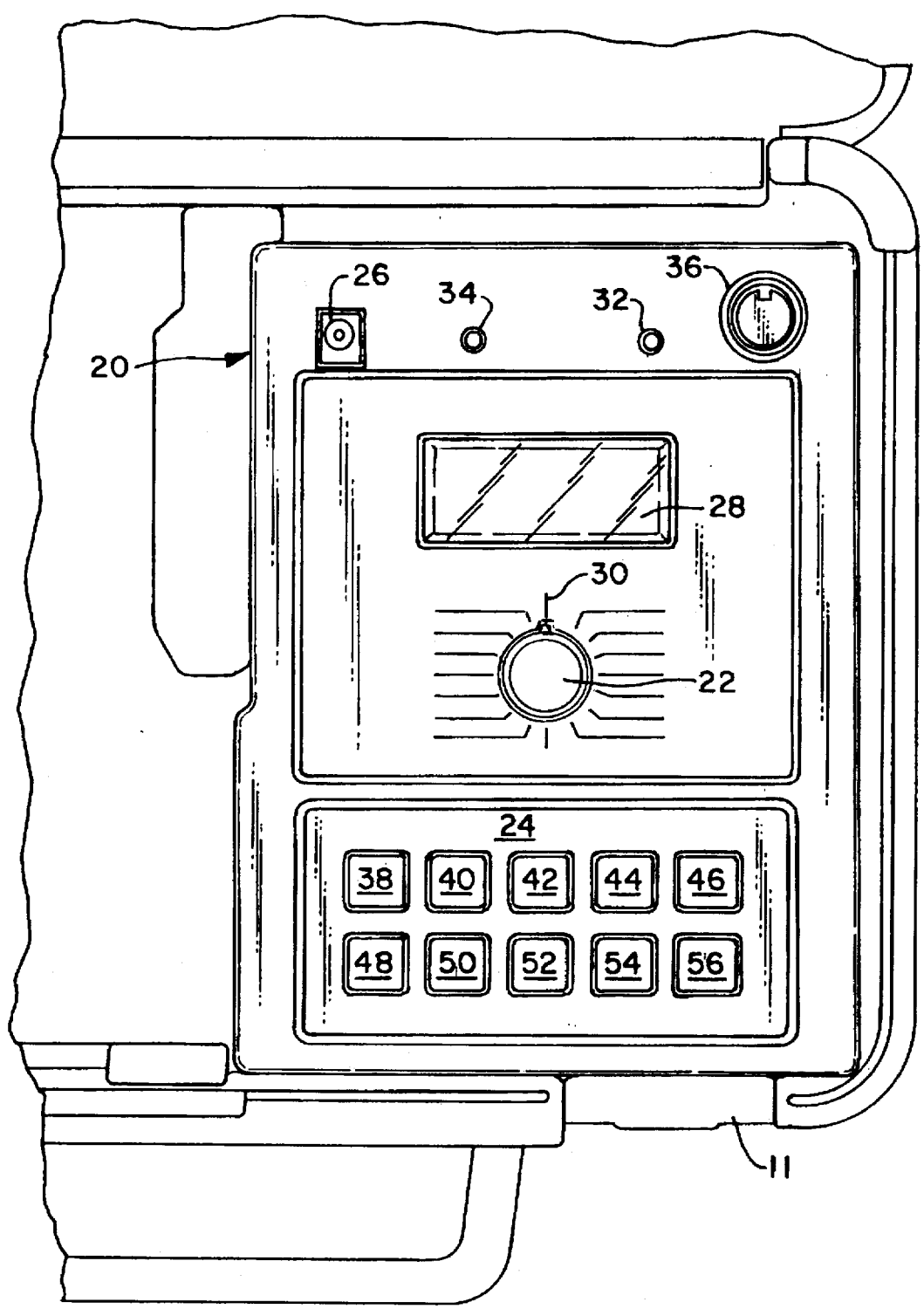
FIG. 3 is a top view, partly broken away of the housing and the control panel of the super heat calculator of FIG. 1.

With reference to the drawings wherein like numerals represent like parts throughout the several figures, an apparatus for calculating super heat in accordance with the present invention is generally designated by the numeral 10. The super heat calculator 10 is comprised of microprocessor 12, a control panel 20, a temperature sensor 70, and a pressure sensor 80. In a preferred embodiment, the microprocessor 12 and control panel 20 are housed in a housing 11 made of high-impact polymeric material or other suitable material.

The microprocessor 12 includes a data processor 13 for performing arithmetic and logic operations and a data storage unit 14 for storing all necessary programs and digitized data including instruction data and operand data. The programs stored in the data storage unit 14 include a vapor pressure model for at least one refrigerant. The vapor pressure model includes a listing of vapor pressures for a plurality of vapor temperature points at saturated conditions. Additional vapor pressures or vapor temperatures may be interpolated from the table. In a preferred embodiment, vapor pressure models for all expected refrigerants would be stored in the data storage unit.

The control panel 20 comprises a rotary switch 22, a ten (10) position keypad 24, a battery eliminator power jack 26 and a display unit 28. Preferably, the display unit 28 is a 0.5 inch high LCD display having four (4) digits and one (1) decimal point. Other suitable control panel mountable display units may be also used. Alternatively, the super heat calculator 10 may have a free-standing display unit (not shown). The rotary switch 22 is used to select the vapor pressure model that will be used by the microprocessor 12. Preferably, the rotary switch 22 has sixteen (16) positions with one position 30 assigned to each refrigerant. Positioning the rotary switch 22 at one of the switch positions 30 directs the microprocessor 12 to utilize the vapor pressure model associated with the refrigerant assigned to the switch position. A dual slope analog to digital converter 66 located in the control panel 20 converts the sensed temperature or pressure signals from an analog signal to a digital signal. The dual slope converter 66 may be any high precision analog to digital converter. The control panel 20 also comprises input jacks 32, 34, for at least one temperature sensor 70, 70' and a port 36 for the pressure sensor 80.

The calculator 10 is preferably powered by six AA alkaline batteries 60. Alternatively, a 9 volt DC power supply (not shown) may be connected to the calculator 10 via the battery eliminator jack 26. A voltage regulator and voltage doubler 62 provides +5 VDC power to the microprocessor 12 and the display driver 29; +8 VDC power to a current source 64 and the dual slope analog to digital converter 66; and power (VPSI) to the pressure transducer 84.

The temperature sensors 70, 70' preferably comprise a thermistor temperature probe 72 having a twelve foot PVC insulated connector 74. A current source 64 provides power through current switch 68 to the selected thermistor temperature probes 72. Other suitable temperature sensors and connectors may also be used. The temperature sensor 70 has a minimum range of −40° to 300° F. and a minimum resolution of 0.1° F. The pressure sensor 80 is preferably a six foot PVC probe 82 that is in fluid communication with a pressure transducer 84, located in the housing 11, via the pressure sensor input jack 36. The transducer 84 has a minimum range of 0 to 300 psi and a minimum resolution of 1 psi. In a preferred embodiment, the pressure sensor 80 is capable of detecting pressures as low as 0 psia.

The connector 74 for a first temperature sensor 70 is connected to the control panel 20 via the T1 input jack 32. Proper operation of the temperature sensor 70 can be verified by subjecting the temperature probe 72 to heat or cold and observing the T1 temperature value on the display 24. The temperature may be displayed in units of either Fahrenheit or Centigrade. The units are selected by pressing the F/C button 54. The units selected changes from Fahrenheit-to-Centigrade-to-Fahrenheit each time the button 54 is pushed. Turning the calculator 10 off with the OFF button 48 causes the units selected to be stored in the storage unit 14.

The pressure probe 82 is connected to the control panel 20 via the port 36. The pressure sensor 80 should be zeroed out periodically. This is accomplished by pressing both ZERO ADJ. buttons 44, 50 at the same time while the pressure probe 82 is at atmospheric pressure. The pressure may be displayed in units of psi, bar or kgf/cm². The units are selected by pressing the P1 UNITS button 54. The units selected changes from psi-to-bar-to-kgf/cm²-to-psi each time the button 54 is pushed. Turning the calculator 10 off with the OFF button 48 causes the units selected to be stored in the storage unit 14.

The temperature probe 72 and pressure probe 82 are generally installed between the evaporator 17 and the low pressure side of the compressor 18 of the subject air conditioning system 16. The calculator 10 is turned on using the ON button 38. The temperature of the refrigerant (T1) will automatically be displayed. The selector switch 22 is then positioned to select the refrigerant utilized in the air conditioning system 16. Button P1 44 is pressed to display the sensed refrigerant pressure. If both the indicated temperature and pressure are within expected limits, calculation of the degree of super heat is initiated by pressing the SUPERHEAT button 46.

Upon initiation of the super heat calculation, the calculator 10 reads the refrigerant temperature (T1) and pressure (P1) values and stores the values in the storage unit 14. The data processor 13 accesses the vapor pressure model stored in the storage unit 14 that corresponds to the refrigerant selected by the rotary switch 22. The data processor 13 calculates the vapor temperature (VT1) which corresponds to the sensed refrigerant pressure (P1) by interpolation. The data processor 13 then calculates the super heat value by subtracting the calculated vapor temperature (VT1) from the value of the sensed refrigerant temperature (T1). The calculated super heat value should be a positive value. A negative super heat value indicates that the temperature probe 72 may be installed incorrectly or that the wrong refrigerant has been selected by the rotary switch 22.

The calculated super heat is compared to the ideal super heat to determine if the performance of the air conditioning system 16 must be adjusted. The difference between the calculated super heat and the ideal super heat indicates the type and amount of adjustment that is required.

The calculator 10 may also be used to measure the difference in temperature of the refrigerant at two different locations in the air conditioning system 16. The connector 74 of a second temperature sensor 70' is connected to the control panel 20 via the T2 input jack 34. The temperature probe 72 of the second temperature sensor 70' is installed at some location in the air conditioning system. The calculator 10 is turned on by pressing the ON button 38. The temperature of the refrigerant (T1) will automatically be displayed and saved in the data storage unit. Pressing the T2 button 42 causes the second temperature to be measured and saved in the data storage unit 14. Calculation of the absolute temperature difference is initiated by pressing the T1–T2 button 50.

The calculator 10 may be placed in a continuous-on mode by pressing the OC button 56 three times within 5 seconds. A light 56 will commence flashing, indicating that the calculator is in the continuous-on mode.

The calculator 10 records the minimum and maximum sensed refrigerant pressures and temperatures and the minimum and maximum calculated super heat values. These values may be accessed by pressing the MINIMAX button 52. The stored minimum and maximum values are erased when the calculator is turned off or when another measured variable other than superheat is selected.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. Apparatus for calculating the degree of super heat in an air conditioning system, the air conditioning system containing one of a plurality of refrigerants, the apparatus comprising:

first temperature sensing means for sensing the temperature of the refrigerant and transmitting a first temperature signal proportional to the sensed temperature;

pressure sensing means for sensing the pressure of the refrigerant and transmitting a pressure signal proportional to the sensed pressure;

a computer platform including data processor means for performing arithmetic and logic operations on digitized data, data storage means coupled to said data processor means, for storing digitized data including instruction data and operand data, first input means for supplying instruction data to said data processor means, second input means for receiving and digitizing said first temperature signal and said pressure signal, said second input means supplying said digitized first temperature signal and said digitized pressure signal to said data processor means, said data storage means containing a stored computer program including modelling means for modelling the vapor pressure of the refrigerant at a plurality of vapor temperature points, said modelling means comprising a plurality of models wherein each of said models defines the vapor pressure of one of the refrigerants at a plurality of vapor temperature points, comparison means for comparing said digitized pressure signal to said model wherein said digitized pressure signal and said model define a vapor temperature value, and computing means for computing and transmitting a super heat value wherein said super heat value is the difference between said digitized first temperature signal and the vapor temperature value; and display means for receiving and displaying said super heat value.

2. The apparatus of claim 1 where in said computer platform further comprise selection means for selecting a said model from said plurality of models.

3. The apparatus of claim 1 further comprising output means for recording at least some of the results of the arithmetic and logic operations of the data processor means.

4. The apparatus of claim 1 further comprising a second temperature sensing means for sensing the temperature of the refrigerant and transmitting a second temperature signal proportional to the sensed temperature.

5. The apparatus of claim 4 wherein said second input means receives and digitizes said second temperature signal, said second input means supplying said digitized second temperature signal to said data processor means.

6. The apparatus of claim 5 further comprising a second comparison means for comparing said digitized first temperature signal to said digitized second temperature signal.

7. The apparatus of claim 1 wherein said first input means comprises a keypad having a plurality of input keys.

8. The apparatus of claim 4 wherein said first and second temperature sensing means each comprise a thermistor temperature probe.

9. The apparatus of claim 1 wherein said first temperature sensing means has a minimum range of approximately –40° to 300° F.

10. The apparatus of claim 9 wherein said first temperature sensing means has a minimum resolution of approximately 0.1° F.

11. The apparatus of claim 1 wherein said pressure sensing means has a minimum range of approximately 0 to 300 psi.

12. The apparatus of claim 11 wherein said pressure sensing means has a minimum resolution of approximately 1 psi.

13. A method for calculating the degree of super heat in an air conditioning system containing one of a plurality of refrigerants, comprising the steps of:

providing a superheat measuring device comprising a computer platform having a stored computer program including a plurality of models, each of said models defining vapor pressure values of one of the refrigerants at a plurality of vapor temperature points;

selecting the model corresponding said one refrigerant;

measuring the temperature of the refrigerant and transmitting a temperature signal proportional to the sense temperature to the computer platform;

measuring the pressure of the refrigerant and transmitting a pressure signal proportional to the sensed pressure the computer platform;

comparing said pressure signal to said model to define a vapor temperature value; and computing the difference between said temperature signal and said vapor temperature value to determine the heat value of the refrigerant.

14. A method for optimizing the of an air conditioning system containing one of a plurality of refrigerants, each of the refrigerants having an ideal super value when the refrigerant is between the evaporator and the compressor of air conditioning system, the method comprising the steps of:

providing a superheat measuring device comprising a computer platform having a stored computer program including of models, each of said models defining vapor pressure values of the refrigerants at a plurality of vapor temperature points;

selecting the model corresponding to said one refrigerant;

measuring the temperature of the refrigerant and transmitting a first temperature signal proportional to the sensed temperature to the computer platform;

measuring the pressure of the refrigerant and transmitting a pressure signal proportional to the sensed pressure to the computer platform;

comparing said pressure signal to said model to define a vapor temperature value;

computing the difference between said first temperature signal and said vapor temperature value to determine a super heat value;

displaying said computed super heat value;

comparing said computed super heat value with the ideal super heat value; and adjusting the performance of the air conditioning unit.

15. Apparatus for optimizing the performance of an air conditioning system, the air conditioning system containing one of a plurality of refrigerants, the refrigerant having an ideal super heat value when the refrigerant is between the evaporator and the compressor of the air conditioning system, the apparatus comprising:

first temperature sensing means for sensing the temperature of the refrigerant and transmitting a first temperature signal proportional to the sensed temperature;

pressure sensing means for sensing the pressure of the refrigerant and transmitting a pressure signal proportional to the sensed pressure;

a computer platform including data processor means for performing arithmetic and logic operations on digitized data, data storage means coupled to said data processor means, for storing digitized data including instruction data and operand data, first input means for supplying instruction data to said data processor means, second input means for receiving and digitizing said first temperature signal and said pressure signal, said second input means supplying said digitized first temperature signal and said digitized pressure signal to said data processor means, said data storage means containing a stored computer program including a plurality of models wherein each of said models defines the vapor pressure of one of the refrigerants at a plurality of vapor temperature points, input means for selecting a said model corresponding to the refrigerant, comparison means for comparing said digitized pressure signal to said model wherein said digitized pressure signal and said model define a vapor temperature value, and computing means for computing and transmitting a super heat value wherein said super heat value is the difference between said digitized first temperature signal and the vapor temperature value; and display means for receiving and displaying said computed super heat value;

wherein said computed super heat value is compared with the ideal super heat value and the performance of the air conditioning unit thereby adjusted.

16. The apparatus of claim 15 wherein said computer platform further comprises selection means for selecting a said model from said plurality of models.

17. The apparatus of claim 15 wherein said first and second temperature sensing means each comprise a thermistor temperature probe having a minimum range of approximately −40° to 300° F. and a minimum resolution of approximately 0.1° F.

18. The apparatus of claim 15 wherein said pressure sensing means has a minimum range of approximately 0 to 300 psi and a minimum resolution of approximately 1 psi.

* * * * *

UNITED STATES PATENT AND TRADEMARK OFFICE
CERTIFICATE OF CORRECTION

PATENT NO. : 5,666,815
DATED : September 16, 1997
INVENTOR(S) : Arthur Aloise

It is certified that error appears in the above-indentified patent and that said Letters Patent is hereby corrected as shown below:

```
Column 6, line 52, after "sensed pressure", insert --to--;
         line 57, before "heat", insert --super--;
         line 59, after "the", insert --performance--;
         line 61, after "super", insert --heat--;
         line 62, before "air", insert --the--;
         line 66, after "including", insert --a plurality--.

Column 7, line 1, before "the", insert --one of--.
```

Signed and Sealed this

Third Day of March, 1998

Attest:

BRUCE LEHMAN

Attesting Officer

*Commissioner of Patents and Trademarks*